Nov. 1, 1955  J. W. KOONCE  2,722,210
QUICK CHANGE UPPER CYLINDER AND VALVE LUBRICATOR
Filed Feb. 27, 1953  2 Sheets-Sheet 1
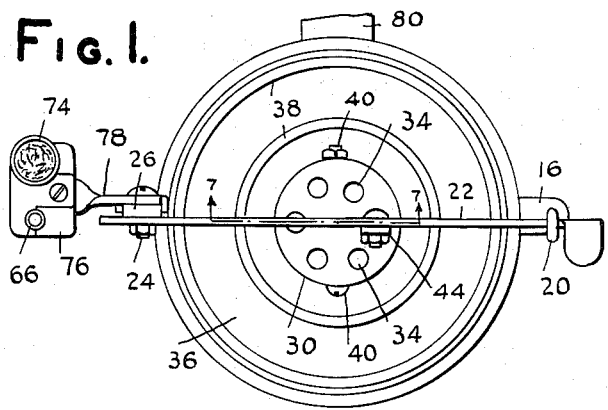
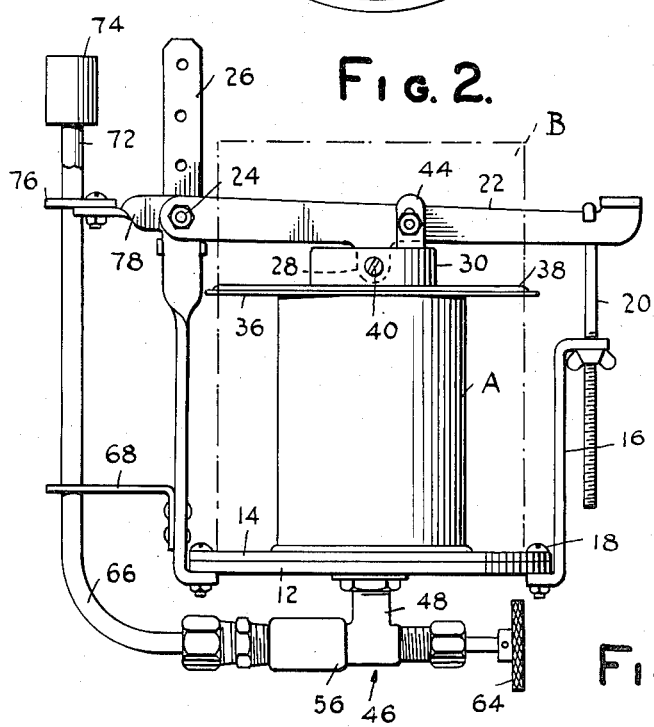
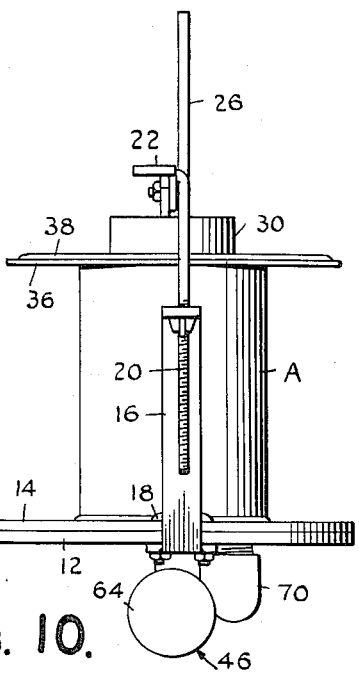
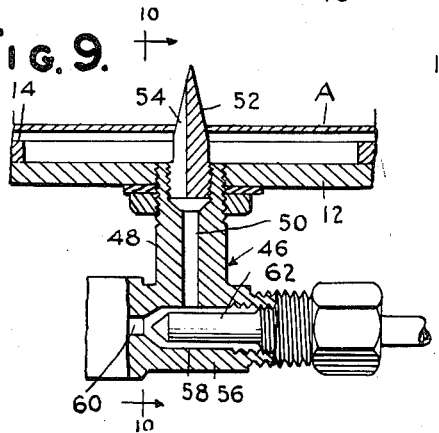
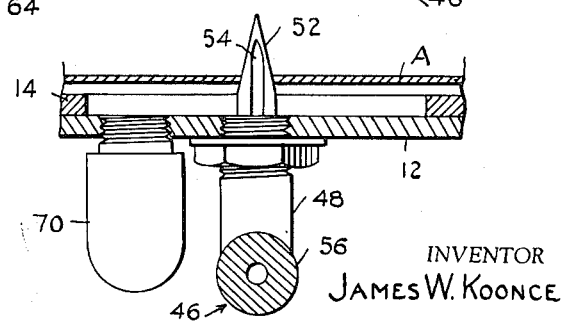
INVENTOR
JAMES W. KOONCE
BY
McMorrow, Berman & Davidson
ATTORNEY Nov. 1, 1955    J. W. KOONCE    2,722,210
QUICK CHANGE UPPER CYLINDER AND VALVE LUBRICATOR
Filed Feb. 27, 1953    2 Sheets-Sheet 2
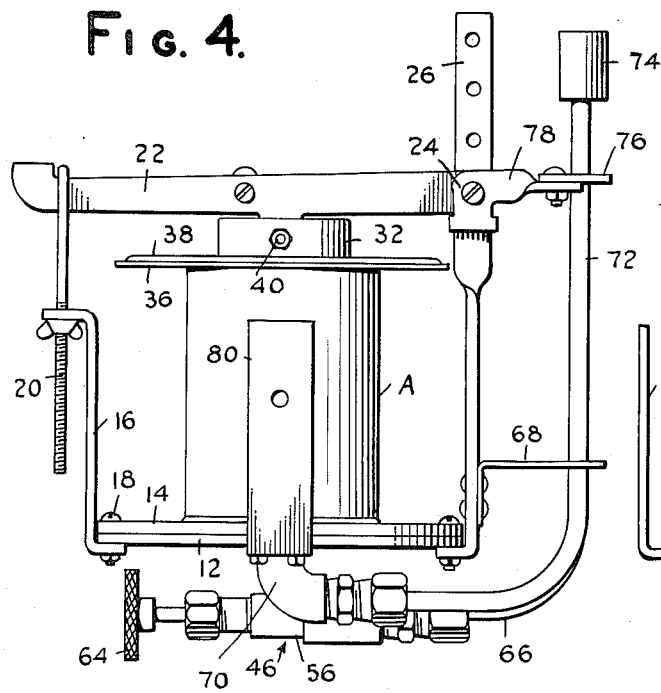
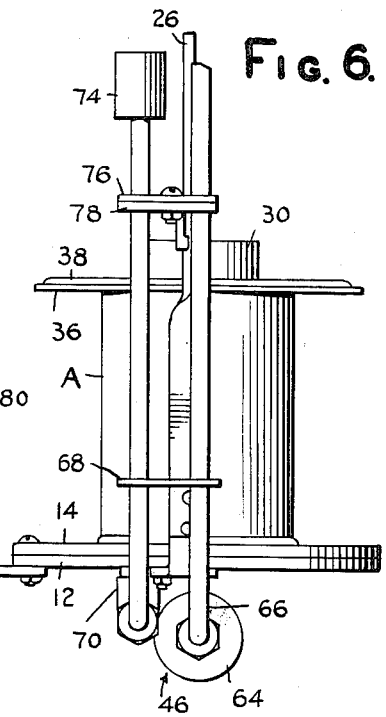
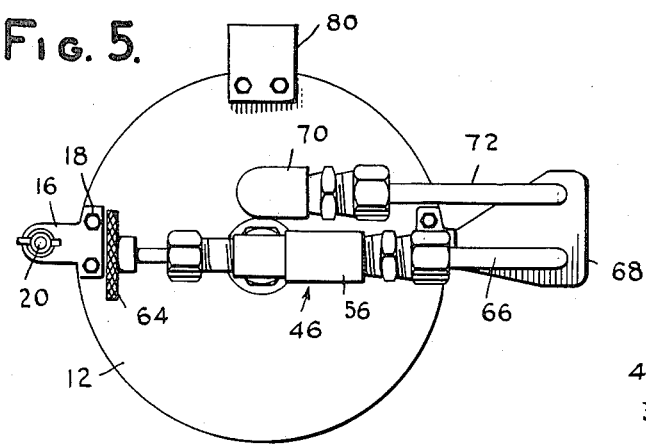
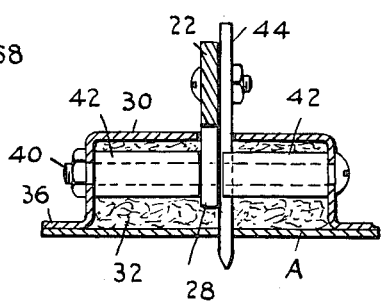
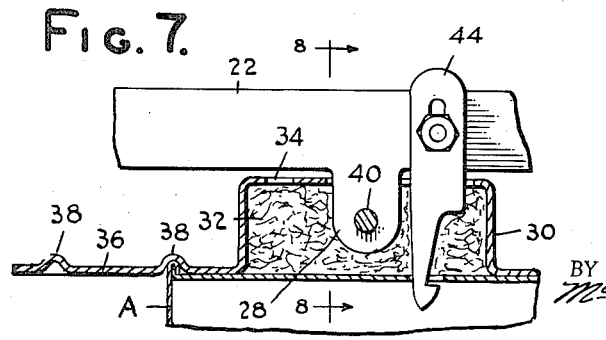
INVENTOR
JAMES W. KOONCE
BY McMorrow, German & Davidson
ATTORNEY

United States Patent Office 2,722,210
Patented Nov. 1, 1955

2,722,210

QUICK CHANGE UPPER CYLINDER AND VALVE LUBRICATOR

James W. Koonce, Alexandria, La.

Application February 27, 1953, Serial No. 339,221

2 Claims. (Cl. 123—196)

This invention relates to a device for holding a can of lubricant for upper cylinders and valves of internal combustion engines, and for controlling the feeding of said lubricant to the engine.

The use of upper lubricant, to free sluggish valves and rings and increase compression and power is, of course, in itself well known. Conventionally, such lubricant is fed to the engine through the air intake. It is desirable, in this connection, that a lubricant of this type be fed to the engine under controlled conditions, and with maximum facility. Heretofore, to my knowledge, means has not been devised that will achieve these desirable ends. Accordingly, the main object of the present invention is to provide a device which will open, hold, and vent any of various sizes of refinery sealed cans of upper lubricant, and will feed the lubricant to the engine through the intake manifold thereof under completely controlled conditions.

Another object is to provide a device of the type referred to that will include a regulating valve that can be set at a predetermined location, when the engine is at idle speed, with the setting of said valve being effective to thereafter control the flow of oil properly at all operating speeds and engine conditions.

Another object of importance is to provide, in a device of the type stated, a liquid level gauge which will afford a visual indication to the user as to the amount of lubricant remaining in the container, and the rate of speed at which said lubricant is flowing into the engine.

Other objects will appear from the following description, the claims appended thereto, and from the annexed drawings, in which like reference characters designate like parts throughout the several views, and wherein:

Figure 1 is a top plan view of an upper lubricant feed device formed in accordance with the present invention;

Figure 2 is a side elevational view, the dotted lines indicating another size of container that can be held by the device;

Figure 3 is an elevational view taken from the right of Figure 2;

Figure 4 is a side elevational view, showing the side opposite that shown in Figure 4;

Figure 5 is a bottom plan view;

Figure 6 is an elevational view, taken from the right of Figure 4;

Figure 7 is an enlarged, detail sectional view taken substantially on line 7—7 of Figure 1;

Figure 8 is a sectional view taken substantially on line 8—8 of Figure 7;

Figure 9 is an enlarged, fragmentary sectional view through the puncturing device and regulating valve assembly; and Figure 10 is a sectional view taken substantially on line 10—10 of Figure 9.

The reference numeral 12 designates a flat, circular base plate. Supported thereon is an annular sealing gasket 14. The outer diameter of the sealing gasket 14 should be greater than that of the largest size can or container which will be held by the device, and the inner diameter of said gasket should be greater than that of the smallest size container to be held.

A hold-down bracket 16, extending upwardly from the periphery of the base plate in substantial perpendicularity to the plane of the base plate, is formed from a flat length of bar material, the lower end of which is extended laterally and inwardly to underlie the marginal portion of the base plate, and the upper end of which is extended laterally and outwardly, as best shown in Figure 4. The inwardly extended lower end of the hold-down bracket 16 is fixedly connected to the base plate by a bolt 18, which also passes through the gasket 14. The outwardly extended upper end of the hold-down bracket 16 is apertured, and slidably mounted in the aperture, for movement along a line parallel to the main portion of the hold-down bracket, is a clamping rod 20. As shown in Figure 2, this is formed with a series of threads intermediate its ends, said threads being engaged with a wing nut that is threadable upwardly against the outwardly extended end of the hold-down bracket 16, thereby to retain the clamp rod 20 in selected positions of adjustment longitudinally of the hold-down bracket. The clamp rod 20 is also threaded at its lower end. The purpose of the last-named threads is to permit the clamp rod 20 to be extended upwardly to a substantial extent, when large containers are to be accommodated. When the clamp rod 20 is adjusted upwardly in this manner, the wing nut would be engaged with the lowermost threads.

The upper end of the clamp rod 20 is formed to a hook shape, and is engaged over the free end of a clamp lever 22 formed from a flat length of bar material. The clamp lever 22 is extended diametrically of the base plate 12, and at its other end is connected by a pivot bolt 24 to the upper end portion of a vertically extending clamp lever support rod 26, formed from a flat length of bar material. Said upper end of the support rod has a longitudinal series of openings, any of which can receive the clamp lever pivot bolt 24. Again, the purpose of this arrangement is to permit the device to accommodate not only the small but large containers of upper lubricant.

As shown in Figure 2, the clamp lever support rod 26 is twisted axially through ninety degrees, at a location medially between its ends, the lower end portion of the support rod having an inwardly and laterally extended end bolted to the base plate 12 at a location diametrically opposite the hold-down bracket 16.

Medially between its ends, the clamp lever 22 is integrally formed with a depending, flat ear 28 (Figure 7). Ear 28 extends downwardly through a slot formed in the center area of a filter cup 30. Filter cup 30 is filled with filter material 32, which can be any type of material found efficient in filtering air. In the flat top portion of the filter cup, a circular series of air intake openings 34 is provided (Figure 1).

Formed integrally upon the depending skirt portion of the filter cup 30 is a flat, outwardly extended hold-down flange 36 the outer diameter of which is, as shown in Figure 2, substantially equal to the diameter of the base plate 12, the hold-down flange being disposed in a plane paralleling and located above that of the base plate.

The hold-down flange 36, as shown in Figure 7, is formed with concentric, spaced grooves, said grooves being defined by stamping upwardly struck, annular indentations 38 in the hold-down flange. There are thus defined annular seats for the upwardly extended circumferential beads of containers of upper lubricant. In full lines, there has been shown in the drawings a small container A, and as shown in Figure 7, the innermost seat would receive the bead of said container. In dotted lines a large container B has been illustrated, and it will be understood that the outer seat would receive the bead of said large container.

The ear 28 is apertured, for extension therethrough of a connecting pin 40, extending diametrically through the filter cup. Spacer sleeves 42 (Figure 8) are circumposed about the pin 40, so as to properly locate the clamp lever and the filter cup relative to one another.

A puncturing element 44, formed from a short length of flat bar material, has a longitudinal slot in its upper end portion, said slot receiving a screw or other fastening element, whereby to connect said puncturing element pivotally to the lever 22. The element 44 extends downwardly through a slot formed in the filter cup 30, and has a tapered lower end having a puncturing prong thereon, said prong being adapted to form an opening in the top wall of the container A or B, as the case may be, when the clamp lever 22 is swung downwardly in the direction of the container about its pivotal connection 24.

The puncturing prong of the element 44, as will be readily seen from Figure 7, is so formed as to define an opening in the upper end of the container through which air can enter the container. Therefore, when air moves into the container, it will pass first through the openings 34, after which said air will move through the filter material 32, and then into the container.

A flow regulating valve assembly has been designated generally by the reference numeral 46, and is disposed under the base plate 12. This assembly has been best shown in Figures 9 and 10, and as will be noted from Figure 9, the assembly includes an inlet branch 48 depending from the base plate 12, at the center of said base plate. At its upper end, the branch 48 is exteriorly threaded, for engagement in complementary threads formed in a center opening of the base plate. A lock nut is also threadedly engaged with the threads of branch 48, said lock nut being threaded upwardly against the base plate 12 for the purpose of securing the branch 48 fixedly to said base plate. A washer may be interposed between the base plate and lock nut, if desired.

Formed in the branch 48 is a longitudinal bore 50, said bore 50 merging at its upper end into a counterbore, the counterbore opening upon the upper end surface of branch 48. The counterbore is threaded, for engaging the complementarily threaded base portion of a puncturing prong 52. The puncturing prong 52 projects upwardly a substantial distance from the base plate 12, and has a tapered or pointed upper end portion in which is formed a longitudinal inlet groove 54. The inlet groove 54 opens, at its lower end, into the counterbore.

It will be seen that when a container A is positioned upon the sealing gasket 14, and the clamp lever 22 is swung downwardly thereagainst, the prong 52 will form an opening in the bottom end of the container, so that upper lubricant can flow through the groove 54 and through the inlet bore 50, into the valve assembly.

Integrally formed upon the lower end of the branch 48, and extending transversely of said branch, is a valve body 56. The valve body 56 has a valve chamber 58 formed therein, said valve chamber being in communication with the outlet end of the inlet bore 50. The valve chamber 58, at one end, is in communication with an outlet bore 60 extending longitudinally of the body 56, in an enlarged portion of the body.

In the chamber 58, there is disposed a needle valve 62, said valve 62 being provided upon a stem that projects out of the valve body, through a suitable fitting or packed bushing, said stem being provided, at its outer end, with a knurled hand knob 64.

Intermedate its ends, the stem of the valve is threaded, for engagement in complementary threads formed in the valve bushing. As a result, rotation of the knob 64 in one direction will cause the valve 62 to move against a tapered valve seat, formed in the inner end of chamber 58. When the valve 62 moves against said seat, it will prevent flow through the outlet bore 60. When the valve 62 is shifted away from its associated seat, it will permit said flow through the bore 60, and as will be appreciated, the flow can be regulated as desired. Good results have been obtained by regulating the valve location at idle engine speed, such adjustment being satisfactory for all operating speeds and conditions.

Connected in communication with the outlet end of bore 60 is a length of feed tubing 66 (Figure 2). The tubing 66 extends upwardly in spaced, parallel relation to the clamp lever support rod 26, and is supported in proper position, at its lower end portion, by an outwardly extending tubing support bracket 68 bolted to the lower end portion of the support rod 26.

Preferably, the feed tubing 66 is formed of a transparent plastic material or the like, so as to afford to the user a visual indication of the flow of the upper lubricant through the tubing to the intake manifold of the engine. At its outlet end, not shown, the tubing 66 would be provided with a suitable fitting for connection of said tubing in communication with the intake manifold. It will be appreciated that when the upper lubricant is being fed through tubing 66 to the engine, the engine would be running.

Liquid level gauge means is incorporated in the invention, and to this end, I provide an L 70 disposed adjacent the branch 48, below the base plate 12. L 70 is provided, at its outlet end, with a connecting fitting, for connection of a length of gauge tubing 72 to said L. At its inlet end, the L 70 will be in communication with the gasket-sealed space between the base plate 12 and the bottom of the container (see Figure 10). Therefore, the upper lubricant, when flowing through the groove 54 of the puncturing prong, will fill said space, and will not only flow into the regulating valve assembly, but will also flow upwardly within the liquid level gauge tubing 72, the upper level of the lubricant within said tubing 72 corresponding at all times to the level of the lubricant within the container.

The tubing 72 would also be of a transparent material, and would be suitably calibrated throughout its length.

At its upper end, the tubing 72 is in communication with the lower end of a cylindrical filter 74, which would be filled with a suitable air filtering material. The upper end of the cylinder or holder 74 will be open to atmosphere.

The upper end portions of the tubing 72 and 66 are supported in proper position by an upper tubing support bracket 76, said bracket 76 having spaced openings receiving the lengths of tubing. The bracket 76 extends laterally and outwardly from the outer end of a bracket support arm 78, which arm 78 will be connected to the lever support rod 26 by the bolt 24. As shown in Figure 4, at its inner end, the support arm 78 is extended downwardly along the upper end portion of the support rod 26, the downwardly extended part of the support arm having at its opposite sides gripping lugs that engage the opposite longitudinal edges of said lever support rod.

A mounting bracket 80 is of L-shape (see Figure 6) and has a laterally extended lower end connected to the base plate 12. The upper end portion of the mounting bracket 80 is extended vertically and upwardly from the base plate, and has an opening, for extension of a suitable fastening element therethrough, not shown. Said fastening element would permit the mounting bracket 80, and hence the entire device, to be secured to a structural member of the vehicle.

In use of the device, and assuming that the valve assembly has been properly set, a container A or B is disposed between the hold-down flange 36 and the base plate 12. The clamp lever 22 is then drawn downwardly by rotation of the wing nut carried by the clamping rod 20. This will cause the puncturing element 44 to form an air vent in the upper end of the can, simultaneously with the formation of the lubricant outlet in the lower end of the can by the puncturing prong 52.

Thereafter, with the engine in operation, the upper lubricant will be fed under controlled conditions through the intake manifold of the engine. At all times, a visual indication is afforded as to the level of the lubricant and the rate of feed thereof to the engine. The user, of course, need do no more than observe the feeding of the lubricant, once he has mounted the device upon the vehicle adjacent the engine and has punctured the container in the manner discussed herein.

It will be appreciated that the venting of the container, at its upper end, permits air to be drawn thereinto, during the feeding of the upper lubricant to the engine. Said air will, of course, be completely filtered, so as to be free of impurities when it begins to be drawn into the intake manifold after the container has been exhausted of lubricant.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

What is claimed is:

1. A feed device for lubricant comprising: a base plate adapted for supporting a container of lubricant thereon; a bracket extending from the base plate; a container hold-down lever pivotally mounted upon said bracket for swinging movement in a vertical plane, toward and away from a container supported upon the base plate, said lever being formed with a depending ear; a connecting pin extending through said ear transversely of the lever; a filter cup having a slot receiving said ear, said pin being engaged at its ends in diametrically opposite portions of the filter cup to connect the cup to the ear, said cup being filled with a filtering material and having an open lower end and an aperture in one wall through which air may pass into the cup for movement through said material and out the open end of the cup; a puncturing element connected to said lever adjacent the ear and extending downwardly from the lever, the filter cup having in its upper end an opening receiving said element, said element having a puncturing prong extending downwardly through the open end of the cup to puncture one end wall of a container engaged against the lower end of the cup, said prong being adapted to form an opening of a size to loosely receive the puncturing element, for passage of air out of the open end of the cup to said last-named opening and into the container; and a puncturing element carried by said base plate for puncturing the other end wall of the container to permit flow of the container contents therefrom.

2. A feed device for lubricant comprising: a base plate adapted for supporting a container of lubricant thereon; a bracket extending from the base plate; a container hold-down lever pivotally mounted upon said bracket for swinging movement in a vertical plane, toward and away from a container supported upon the base plate, said lever being formed with a depending ear; a connecting pin extending through said ear transversely of the lever; a filter cup having a slot receiving said ear, said pin being engaged at its ends in diametrically opposite portions of the filter cup to connect the cup to the ear, said cup being filled with a filtering material and having an open lower end and an aperture in one wall through which air may pass into the cup for movement through said material and out the open end of the cup; a puncturing element connected to said lever adjacent the ear and extending downwardly from the lever, the filter cup having in its upper end an opening receiving said element, said element having a puncturing prong extending downwardly through the open end of the cup to puncture one end wall of a container engaged against the lower end of the cup, said prong being adapted to form an opening of a size to loosely receive the puncturing element, for passage of air out of the open end of the cup to said last-named opening and into the container; and a puncturing element carried by said base plate for puncturing the other end wall of the container to permit flow of the container contents therefrom, said filter cup being formed with a wide, flat circumferential flange, said flange extending outwardly from the filter cup and being integral at its inner periphery with the lower end of the filter cup, the flange being disposed in a plane normal to the plane of swinging movement of the lever and being formed with concentric, annular indentations selectively adapted to receive circumferential beads upstanding from the ends of containers engaged by said flange.

References Cited in the file of this patent

UNITED STATES PATENTS

| Number | Name | Date |
|---|---|---|
| 1,600,404 | Dudley | Sept. 21, 1926 |
| 1,635,563 | Sanford | July 12, 1927 |
| 1,998,164 | Moody | Apr. 16, 1935 |
| 2,049,541 | Hatchel | Aug. 4, 1936 |
| 2,114,459 | Wiswell | Apr. 19, 1938 |
| 2,644,430 | Lang | July 7, 1953 |